US 8,886,712 B2

(12) United States Patent
Otsuka

(10) Patent No.: US 8,886,712 B2
(45) Date of Patent: Nov. 11, 2014

(54) COMMUNICATION DEVICE

(75) Inventor: Naoki Otsuka, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 288 days.

(21) Appl. No.: 13/070,560

(22) Filed: Mar. 24, 2011

(65) Prior Publication Data
US 2011/0295946 A1 Dec. 1, 2011

(30) Foreign Application Priority Data
May 31, 2010 (JP) ................................. 2010-125346

(51) Int. Cl.
*G06F 15/16* (2006.01)
(52) U.S. Cl.
USPC ........................................................ 709/203
(58) Field of Classification Search
None
See application file for complete search history.

(56) References Cited

U.S. PATENT DOCUMENTS

| 6,119,122 | A * | 9/2000 | Bunnell ................................. 1/1 |
| 6,657,990 | B1 * | 12/2003 | Dilip et al. ..................... 370/352 |
| 6,694,354 | B1 | 2/2004 | Elg |
| 7,551,302 | B2 * | 6/2009 | Oki et al. ...................... 358/1.15 |
| 7,788,355 | B2 * | 8/2010 | Maeda .......................... 709/223 |
| 2001/0032252 | A1 * | 10/2001 | Durst et al. .................... 709/218 |
| 2002/0188565 | A1 | 12/2002 | Nakamura et al. |
| 2005/0134893 | A1 | 6/2005 | Han |
| 2006/0129931 | A1 | 6/2006 | Simons et al. |
| 2007/0299905 | A1 * | 12/2007 | Wanda ........................... 709/201 |

FOREIGN PATENT DOCUMENTS

| EP | 1 669 860 A2 | 6/2006 |
| JP | 10-91580 | 4/1998 |
| JP | 10-136142 | 5/1998 |
| JP | 2002-157220 A | 5/2002 |
| JP | 2002-334060 | 11/2002 |
| JP | 2006-027022 A | 2/2006 |
| JP | 2006-172442 A | 6/2006 |
| JP | 2009-160793 A | 7/2009 |
| WO | WO 00/33232 A2 | 6/2000 |

OTHER PUBLICATIONS

Brother, Advanced User's Guide, 2010, Version 0.*
Extended European Search Report dated May 2, 2013 issued in related EP 11159646.6.
Notification of Reason for Refusal dated Feb. 25, 2014 received from the Japanese Patent Office in related application JP 2010-125346 together with English language translation.

* cited by examiner

Primary Examiner — Hassan Phillips
Assistant Examiner — Omeed D Rahgozar
(74) Attorney, Agent, or Firm — Scully, Scott, Murphy & Presser, PC

(57) ABSTRACT

A communication device is connected to a terminal device including a display and a web browser through a network. The communication device includes: a first providing unit that provides a first web page display instruction to the terminal device; and a second providing unit that provides a second web page display instruction to the terminal device for making the web browser display a second web page including a specific message on the display unit. The specific message indicates a solution when the first web page including the predetermined information acquired from the external server is not displayed on the display unit of the terminal device, and the solution is for making the web browser acquire the predetermined information by a different method from the method of acquiring the predetermined information from the external server and display the predetermined information on the display unit of the terminal device.

9 Claims, 14 Drawing Sheets

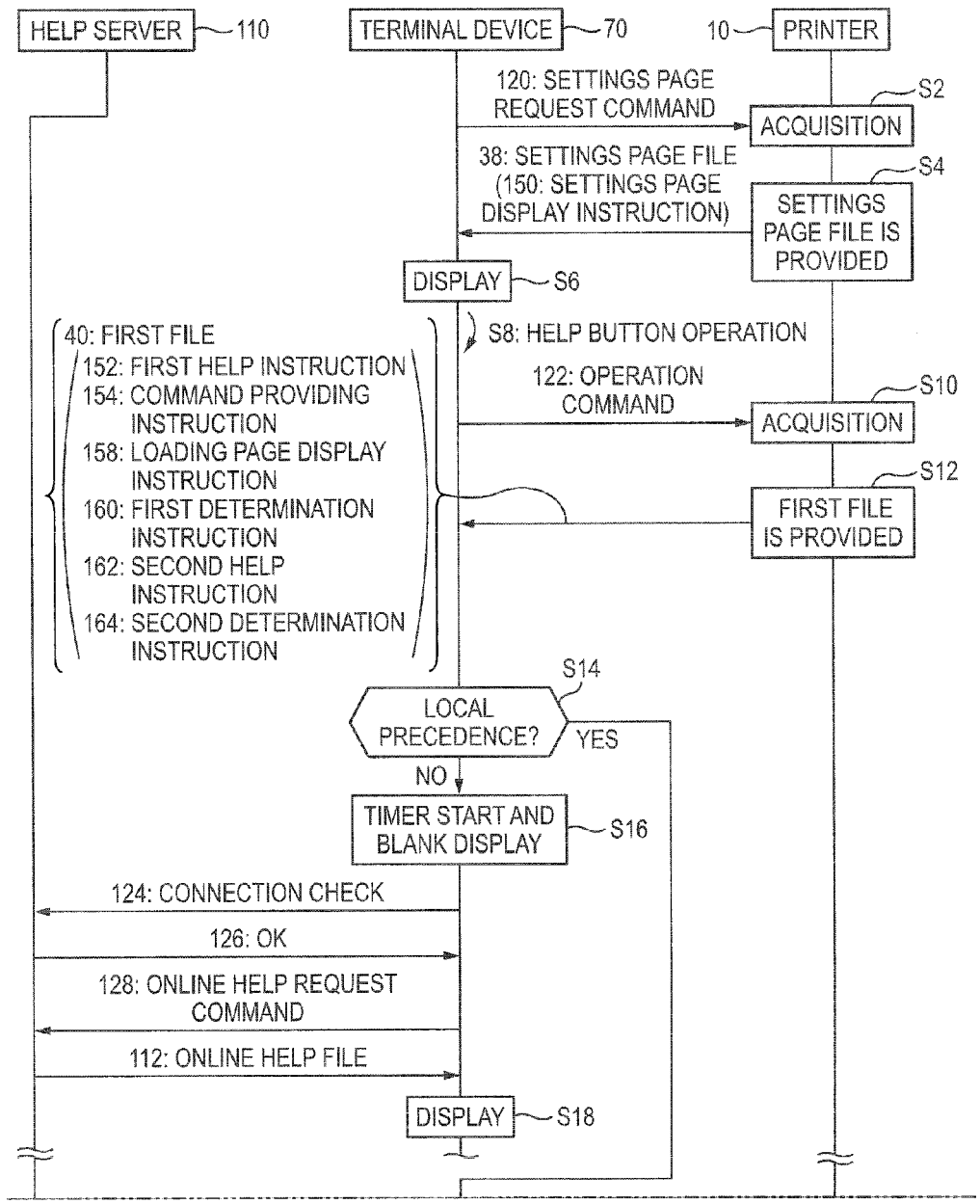

COMMUNICATION DEVICE

CROSS-REFERENCE TO RELATED APPLICATIONS

This application claims priority from Japanese Patent Application No. 2010-125346 filed on May 31, 2010, the entire subject matter of which is incorporated herein by reference.

TECHNICAL FIELD

The present invention relates to a communication device connected to a terminal device, which has a web browser, through a network.

BACKGROUND

There has been proposed a related-art image forming system in which a terminal device having a web browser and a printer are connected to each other through a network. In the related-art image forming system, the web browser acquires various kinds of information from the printer and displays the information on a display unit of the terminal device. Accordingly, a user can check the state of the printer or perform setting of the printer.

SUMMARY

In the above-described related-art image forming system, the web browser of the terminal device acquires the predetermined information stored in the printer and displays a web page including the predetermined information on a display unit of the terminal device. Instead of the related-art image forming system, it may be considered to develop a system using an external server which stores the predetermined information. That is, in such system, the web browser of a terminal device acquires the predetermined information from the external server, and an instruction is given from a printer to the terminal device so that a web page including the predetermined information is displayed on a display unit of the terminal device. According to such system, the printer does not need to supply the predetermined information to the terminal device.

However, for example, when a situation where the terminal device and the external server cannot communicate with each other occurs, the web browser cannot acquire the predetermined information from the external server and accordingly, cannot display the web page including the predetermined information on the display unit of the terminal device.

Therefore, illustrative aspects of the present invention provide a technique that can display predetermined information on a display unit of a terminal device even in a situation where a web page including the predetermined information acquired from an external server cannot be displayed on the display unit of the terminal device.

According to a first aspect of the invention, there is provided a communication device connected to a terminal device with a web browser through a network, the communication device comprising: a first providing unit that provides a first web page display instruction to the terminal device, wherein the first web page display instruction is an instruction for making the web browser execute a first web page display processing of acquiring predetermined information from an external server that stores the predetermined information and displaying a first web page including the predetermined information on a display unit of the terminal device; and a second providing unit that provides a second web page display instruction to the terminal device, wherein the second web page display instruction is an instruction for making the web browser execute a second web page display processing of displaying a second web page including a specific message on the display unit of the terminal device, wherein the specific message indicates a solution when the first web page including the predetermined information acquired from the external server is not displayed on the display unit of the terminal device, and the solution is for making the web browser acquire the predetermined information by a different method from the method of acquiring the predetermined information from the external server so that the web browser displays the predetermined information on the display unit of the terminal device.

According thereto, a solution when the first web page including the predetermined information acquired from the external server is not displayed can be sent to the user of the terminal device. The user can display the predetermined information on the display unit of the terminal device according to the solution when the first web page including the predetermined information acquired from the external server is not displayed.

According to a second aspect of the invention, in the communication device, wherein the different method is a method in which the web browser acquires the predetermined information from a specific storage unit that stores the predetermined information and is formed separately from the external server and the communication device.

According thereto, the terminal device can acquire the predetermined information from the specific storage unit when the user of the terminal device follows the solution. In addition, since the specific storage unit is formed separately from the external server, the terminal device can acquire the predetermined information from the specific storage unit even if a situation occurs in which the terminal device and the external server cannot communicate with each other, for example. In addition, since the specific storage unit is formed separately from the communication device, the communication device itself does not need to store the predetermined information. Accordingly, the amount of information that the communication device should store can be reduced.

According to a third aspect of the invention, in the communication device, wherein the first providing unit provides the terminal device with a first file including the first web page display instruction, wherein the second providing unit provides the terminal device with a second file including the second web page display instruction, the second file being different from the first file, wherein the first file further includes a command providing instruction which, when the predetermined information is not acquired from the external server even if a first predetermined time shorter than a time-out time of the web browser elapses after the web browser accesses the external server according to the first web page display instruction, makes the web browser execute command providing processing for providing a specific command to the communication device before the time-out time elapses, and wherein the second providing unit provides the second file to the terminal device when the specific command is acquired from the terminal device.

A normal web browser displays a time-out page indicating a time-out when it is not possible to acquire the information from an external server before a time-out time elapses after the web browser accesses the external server. According to the above-described configuration, the web browser executes a command providing processing before a time-out time elapses. Therefore, the web browser can acquire the second file from the communication device and notify the user of the terminal device of the above-described solution before the time-out time elapses, that is, before the time-out page is displayed. That is, it is possible to notify the user of the above-described solution without presenting the time-out page to the user.

According to a fourth aspect of the invention, in the communication device, wherein the first file further includes a third web page display instruction for making the web browser execute a third web page display processing, in which: a third web page is not displayed on the display unit of the terminal device during a first period until a second predetermined time shorter than the first predetermined time elapses after the web browser accesses the external server according to the first web page display instruction; and the third web page is displayed on the display unit of the terminal device during a second period until the first predetermined time elapses after the second predetermined time elapses, and wherein the third web page includes a specific display showing that the web browser is accessing the external server.

In a situation where the web browser can acquire the predetermined information from the external server appropriately, the web browser may acquire the predetermined information from the external server very quickly. Therefore, if a configuration is adopted in which the third web page is displayed from immediately after the web browser accesses the external server, the third web page is displayed only for a very short period of time, and then the first web page is displayed. In the case where the third web page is displayed only for a very short period of time, a specific display included in the third web page is momentarily displayed. This may make the user of the terminal device feel uncomfortable. According to the above-described configuration, the third web page is not displayed during the first period until the second predetermined time elapses after the web browser accesses the external server. Therefore, in the situation where the web browser can acquire the predetermined information from the external server quickly, display of the third web page including the specific display only for a very short period of time can be suppressed. Since the occurrence of a situation where a specific display is momentarily displayed can be suppressed, a user's feeling of discomfort caused by the terminal device can be suppressed.

According to a fifth aspect of the invention, in the communication device, wherein the second web page further includes an input field used when a user of the terminal device inputs specific position information indicating a specific region for storing the predetermined information acquired by the different method, wherein the first file further includes a first determination instruction for making the web browser execute a first determination processing of determining whether or not the specific position information has been net on the basis of inputting of the specific position information in the input field included in the second web page displayed on the display unit of the terminal device in the past, wherein the command providing instruction is an instruction for making the web browser execute the command providing processing when the predetermined information is not acquired from the external server even if the first predetermined time elapses after the web browser accesses the external server according to the first web page display instruction and it is determined that the specific position information is not set in the first determination processing, and wherein the first file further includes an information display instruction for making the web browser execute an information display processing in which the predetermined information is acquired from the specific region indicated by the specific position information and displayed on the display unit of the terminal device without making the web browser execute the command providing processing when the predetermined information is not acquired from the external server even if the first predetermined time elapses after the web browser accesses the external server according to the first web page display instruction and it is determined that the specific position information is set in the first determination processing.

According thereto, when the specific position information is input in the input field included in the second web page displayed on the display unit of the terminal device in the past, the web browser can acquire the predetermined information from the specific region in the memory provided in the terminal device and display the predetermined information on the display unit of the terminal device. In addition, since the command providing processing and communication of the second file are not executed in this case, the communication load between the communication device and the terminal device can be reduced.

According to a sixth aspect of the invention, in the communication device, wherein the second web page further includes a selection field used when the user of the terminal device makes a selection regarding precedence of a second method, in which the web browser acquires the predetermined information from the specific region, over a first method, in which the web browser acquires the predetermined information from the external server, wherein the first file further includes a second determination instruction for making the web browser execute a second determination processing in which it is determined whether or not precedence of the second method has been set by selecting the precedence of the second method in the selection field included in the second web page displayed on the display unit of the terminal device in the past, wherein the first web page display instruction is an instruction for making the web browser execute the first web page display processing when it is determined that the second method does not take priority in the second determination processing, and wherein the information display instruction is an instruction for making the web browser execute the information display processing without making the web browser execute the first web page display processing when it is determined that the second method takes priority in the second determination processing.

According thereto, when precedence of the second method over the first method is selected in the selection field included in the second web page displayed on the display unit of the terminal device in the past, the web browser can acquire the predetermined information from the specific region in the memory provided in the terminal device and display the predetermined information on the display unit of the terminal device. In addition, since the first web page display processing is not executed in this case, the communication load between the terminal device and the external server can be reduced.

According to a seventh aspect of the invention, in the communication device, wherein the first web page display instruction and the second web page display instruction are included in the same file, and wherein the second web page display instruction is an instruction for making the web browser execute the second web page display processing of displaying the second web page on the display unit of the terminal device during at least some of a period until a time-out time of the web browser elapses after the web browser accesses the external server according to the first web page display instruction.

According thereto, it is possible to notify the user of the terminal device of the above-described solution before the time-out time of the web browser elapses. That is, it is possible to notify the user of the above-described solution before presenting the time-out page to the user.

According to an eighth aspect of the invention, in the communication device, wherein the second web page further includes a specific display showing that the web browser is accessing the external server.

According thereto, it is possible to notify the user that the web browser is accessing the external server, and it is possible to notify the user of the terminal device of the above-described solution while the web browser is accessing the external server.

According to a ninth aspect of the invention, in the communication device, wherein in the second web page display processing, the second web page is not displayed on the display unit of the terminal device for a third period until a third predetermined time shorter than the time-out time elapses after the web browser accesses the external server according to the first web page display instruction, and the second web page is displayed on the display unit of the terminal device for a fourth period until the time-out time elapses after the third predetermined time elapses.

According thereto, the second web page is not displayed during the third period until the third predetermined time elapses after the web browser accesses the external server. Therefore, in the situation where the web browser can acquire the predetermined information from the external server quickly, display of the second web page including the specific display only for a very short period of time can be suppressed. Since the occurrence of a situation where a specific display is momentarily displayed can be suppressed, a user's feeling of discomfort caused by the terminal device can be suppressed.

In addition, the invention may be applied to a control method for the above-described communication device, a computer program, and a computer-readable recording medium which stores the computer program stored thereon and readable by a computer that is provided in a communication device connected to a terminal device with a web browser through a network. In addition, the invention may also be applied to a system including the above-described communication device and the above-described terminal device.

BRIEF DESCRIPTION OF THE DRAWINGS

FIGS. 2A-2B are views showing the sequence of processing of each device when a terminal device can acquire an online help file in a first embodiment;

DETAILED DESCRIPTION

Exemplary embodiments of the invention will now be described with reference to the drawings.

First Exemplary Embodiment (1) System Configuration

Figure 1:
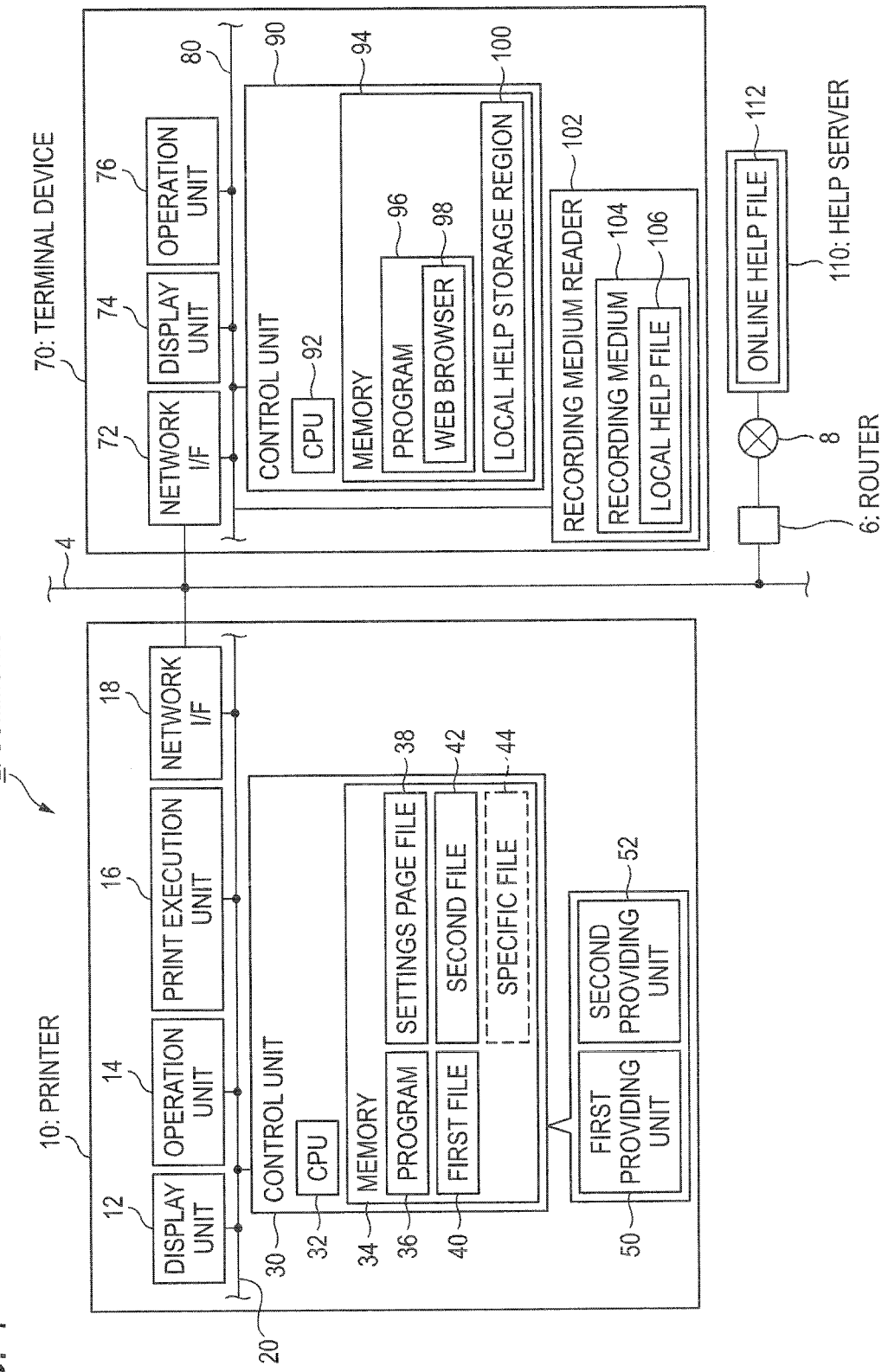
FIG. 1 shows an example of a configuration of a communication system.

A first embodiment will be described with reference to the accompanying drawings. As shown in FIG. 1, a communication system 2 includes a LAN 4, a router 6, the Internet 8, a printer 10, a terminal device 70, and a help server 110. The router 6, the printer 10, and the terminal device 70 are connected to the LAN 4. The router 6 is connected to the Internet 8. The help server 110 is connected to the Internet 8. The printer 10 and the terminal device 70 can communicate with each other through the LAN 4. In addition, the terminal device 70 and the help server 110 can communicate with each other through the LAN 4 and the Internet 8.

(2) Configuration of Printer 10

The printer 10 includes a display unit 12, an operation unit 14, a print execution unit 16, a network interface 18, and a control unit 30. In addition, all of the units 12, 14, 16, 18, and 30 are connected to a bus line 20. The display unit 12 is a display device for displaying various kinds of information. The operation unit 14 is formed by a plurality of keys. The user can input various instructions to the printer 10 by operating the operation unit 14. The print execution unit 16 includes a printing mechanism, which is of an ink jet head type, a laser type, or the like, and performs printing in response to an instruction from the control unit 30. The network interface 18 is connected to the LAN 4. The control unit 30 includes a CPU 32 and a memory 34. The memory 34 stores a program 36, a settings page file 38, a first file 40, and a second file 42. In addition, in FIG. 1, a specific file 44 is shown by a broken line in the memory 34 in FIG. 1. This specific file 44 is used in a second embodiment which will be described later. The CPU 32 executes processing according to the program 36 stored in the memory 34. By executing processing according to the program 36 by the CPU 32, functions of first and second providing units 50 and 52 are realized.

(3) Configuration of Terminal Device 70

The terminal device 70 includes a network interface 72, a display unit 74, an operation unit 76, a control unit 90, and a recording medium reader 102. In addition, all of the units 72, 74, 76, 90, and 102 are connected to a bus line 80. The network interface 72 is connected to the LAN 4. The display unit 74 is a display device for displaying various kinds of information. The operation unit 76 is formed by a keyboard and a mouse. The user can input various instructions to the terminal device 70 by operating the operation unit 76. The control unit 90 includes a CPU 92 and a memory 94. The memory 94 stores a program 96. The program 96 includes a web browser 98. The memory 94 has a local help storage region 100. The CPU 92 executes processing according to the program 96 stored in the memory 94. Various functions are realized when the CPU 94 executes processing according to the program 96 including the web browser 98. In addition, in the following explanation, "CPU 94 executes processing according to the web browser 98" may be referred to as "web browser 98 executes processing". The recording medium reader 102 reads the data stored in a recording medium 104.

The recording medium 104 is a medium, such as a CD or a DVD for storing the data, and is manufactured by the vendor of the printer 10. The recording medium 104 is packaged together with the printer 10 at the time of shipment of the printer 10. The recording medium 104 stores a local help file 106 including the help information (refer to reference numeral 284 in FIG. 7) of the printer 10.

(4) Configuration of Help Server 110

The help server 110 stores an online help file 112 including the help information (refer to reference numeral 244 in FIG. 5) of the printer 10. The help information included in the online help file 112 is the same information as the help information included in the local help file 106.

(5) Processing Executed by Each Device

Subsequently, processing executed by each device of the communication system 2 will be described with reference to FIGS. 2 to 9.

(5-1) Processing when the Terminal Device 70 and the Help Server 110 Can Communicate with Each Other First, referring to FIG. 2, processing when the terminal device 70 and the help server 110 can communicate with each other will be described. The user performs a display request operation of a settings page 200 (refer to FIG. 3) by operating the operation unit 76 of the terminal device 70. When the display request operation of the settings page 200 is performed, the web browser 98 of the terminal device 70 transmits a settings page request command 120 to the printer 10. The printer 10 acquires the settings page request command 120 (S2). In this case, the printer 10 reads a settings page file 38 from the memory 34 (refer to FIG. 1) and provides the read settings page file 38 to the terminal device 70 (S4). The settings page file 38 includes a settings page display instruction 150. The settings page display instruction 150 is the source code for making the web browser 98 of the terminal device 70 execute settings page display processing (refer to step S6). After acquiring the settings page file 38, the web browser 98 displays the settings page 200 of FIG. 3 on the display unit 74 according to the settings page display instruction 150 (S6). The settings page 200 is a page for performing various kinds of settings of the printer 10. As shown in FIG. 3, the settings page 200 includes an IP address input field 202, a subnet mask input field 204, a gateway address input field 206, a submit button 210, and a help button 212.

The user can input items of information, which should be set in the printer 10, in the input fields 202, 204, and 206 by operating the operation unit 76 and operate the submit button 210. In this case, the web browser 98 transmits to the printer 10 each item of the information input by the user. Accordingly, each item of the information input by the user is set in the printer 10. That is, the printer 10 executes communication using a set IP address and the like.

Figure 2B:
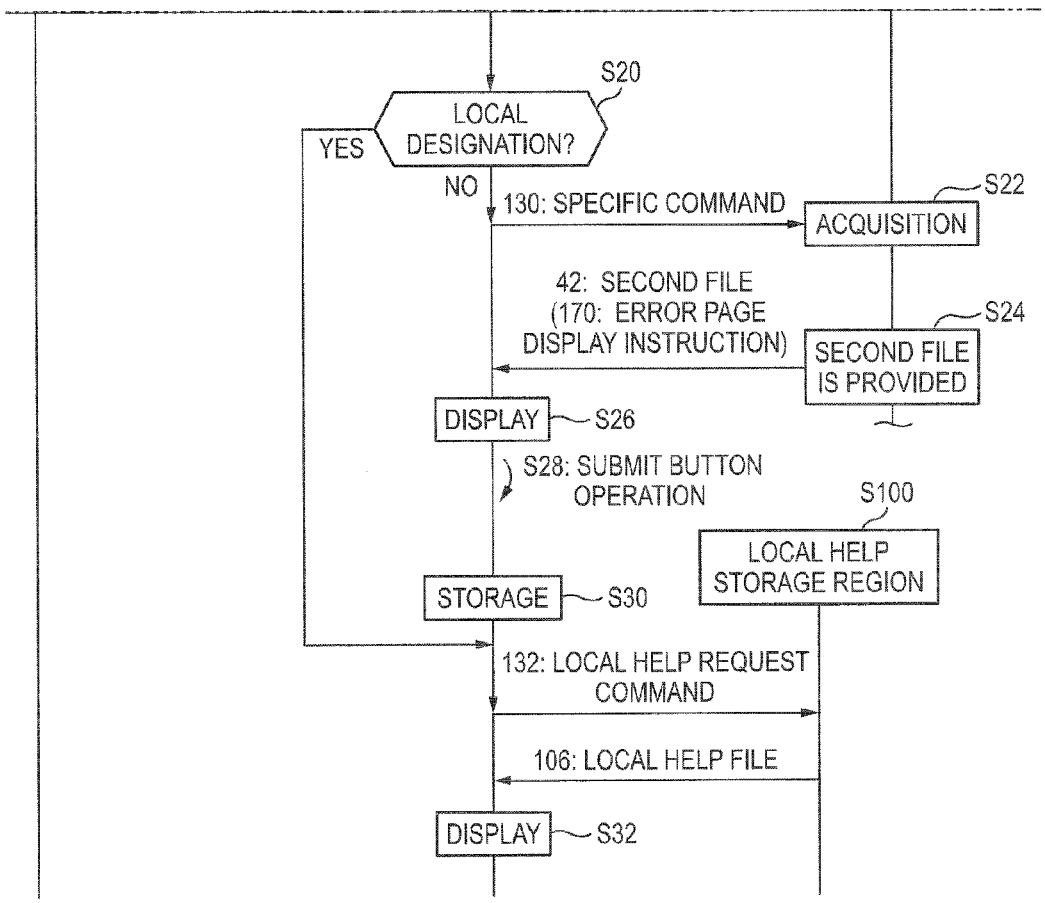
Figure 3:
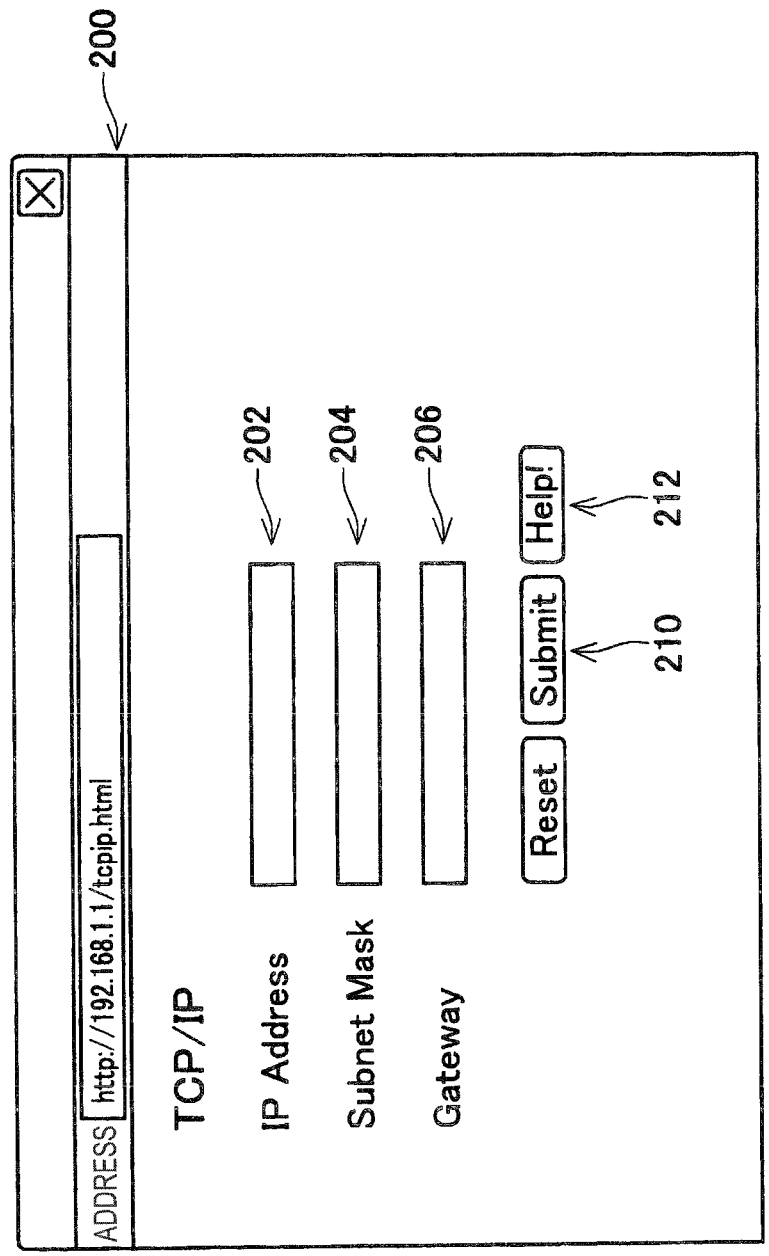
FIG. 3 shows an example of a settings page.

In addition, the user can operate the help button 212 in the settings page 200 by operating the operation unit 76 of the terminal device 70 (S8 in FIG. 2). When a help button operation in step S8 is executed, the web browser 98 transmits an operation command 122 to the printer 10. The printer 10 acquires the operation command 122 (S10). Then, the first providing unit 50 (refer to FIG. 1) of the printer 10 reads the first file 40 from the memory 34 and provides the read first file 40 to the terminal device 70 (S12). The first file 40 includes a first help instruction 152, a command providing instruction 154, a loading page display instruction 158, a first determination instruction 160, a second help instruction 162, and a second determination instruction 164. These instructions 152 to 164 included in the first file 40 are source codes for making the web browser 98 execute various kinds of processing described below.

After acquiring the first file 40, the web browser 98 determines whether or not setting of the web browser 98 is for local precedence according to the second determination instruction 164 included in the first file 40 (S14). The method of setting local precedence will be described later. In step S14, the web browser 98 reads a cookie (not shown) from the memory 94 and determines whether or not the read cookie indicates local precedence. If the cookie indicates local precedence, the web browser 98 makes a determination as YES in step S14. If YES in step S14, the process proceeds to step S20. On the other hand, if NO in step S14, the process proceeds to step S16.

Figure 4:
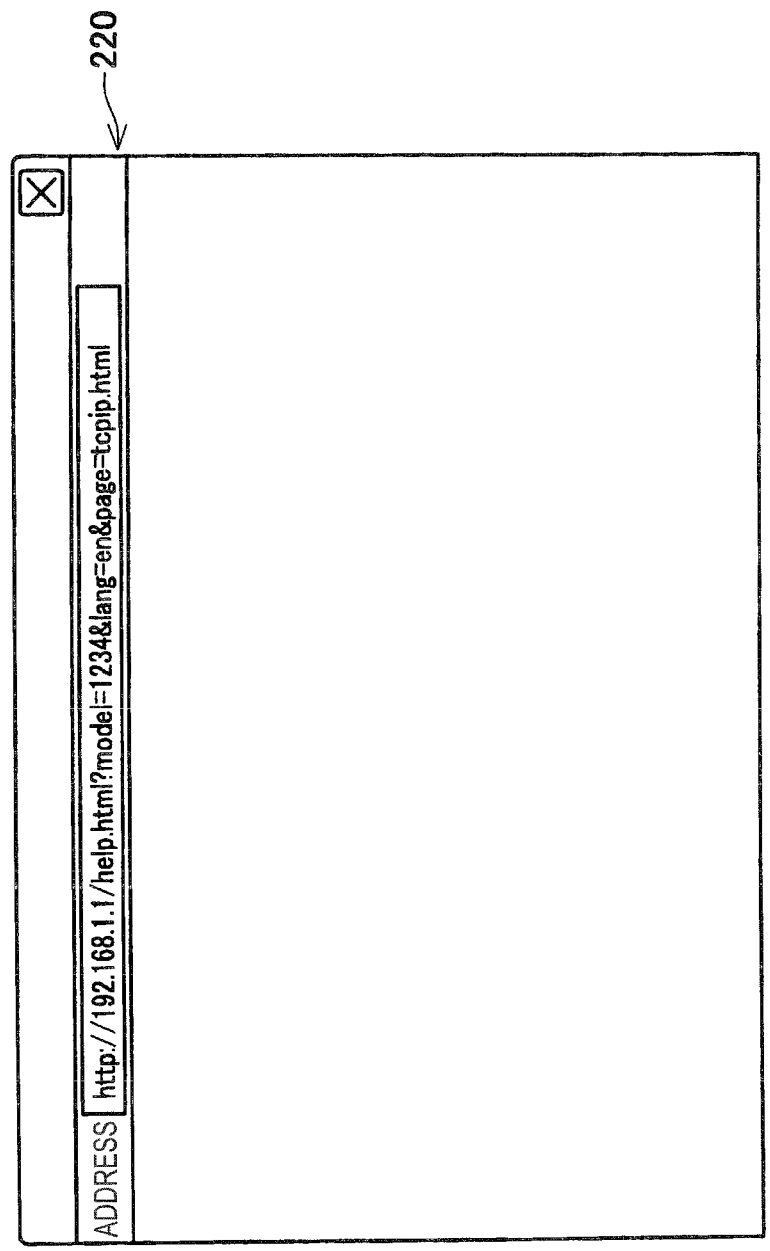
FIG. 4 shows an example of a blank page.

In step S16, the web browser 98 starts a timer according to the first help instruction 152 included in the first file 40. In addition, at the point of time of step S16, the web browser 98 does not display a loading page 300 of FIG. 9 on the display unit 74 according to the loading page display instruction 158 included in the first file 40. Therefore, at the point of time of step S16, a blank page 220 shown in FIG. 4 is displayed on the display unit 74 of the terminal device 70. The blank page 220 is a page which is blank.

After step S16 shown in FIG. 2 ends, the web browser 98 transmits connection check 124 to the help server 110 according to the first help instruction 152. In the example shown in FIG. 2, the terminal device 70 and the help server 110 can communicate with each other. Accordingly, the help server 110 acquires the connection check 124 and transmits an OK signal 126 to the terminal device 70. By acquiring the OK signal 126, the web browser 98 can check that the terminal device 70 and the help server 110 can communicate with each other. After acquiring the OK signal 126, the web browser 98 transmits an online help request command 128 to the help server 110 according to the first help instruction 152. After acquiring the online help request command 128, the help server 110 reads the online help file 112 (refer to FIG. 1) and provides the read online help file 112 to the terminal device 70. The online help file 112 includes a source code for displaying an online help page 240 (refer to FIG. 5) in addition to the help information. After acquiring the online help file 112, the web browser 98 displays the online help page 240 of FIG. 5 on the display unit 74 according to the first help instruction 152 (S18). The online help page 240 includes help information 244 included in the online help file 112. The help information 244 is an explanation regarding the settings page 200. For example, the help information 244 indicates that the settings page 200 is used to change each parameter of TCP/IP of the printer 10. In addition, for example, the help information 244 is an explanation regarding the IP address, subnet mask, and the like which should be input in the settings page 200. Moreover, only some of the help information 244 is displayed in FIG. 5. The user can see the entire help information 244 by scrolling the online help page 240. In addition, when the online help page 240 is displayed on the display unit 74 in step S18, the web browser 98 stops and resets counting of the timer started in step S16.

As described above, when setting of the terminal device 70 is determined to be local precedence in step S14 of FIG. 2 (YES in step S14), the process proceeds to step S20. In step S20, the web browser 98 determines whether or not a path (hereinafter, referred to as a "specific path") for the local help storage region 100 (refer to FIG. 1) is already designated according to the first determination instruction 160 included in the first file 40 (S20). Specifically, in step S20, the web browser 98 reads a cookie (not shown) from the memory 94 and determines whether or not the read cookie indicates a specific path. If the cookie indicates a specific path, the web browser 98 makes a determination as YES in step S20. If the read cookie does not indicate the specific path, the web browser 98 makes a determination as NO in step S20.

If NO in step S20, the web browser 98 provides a specific command 130 to the printer 10 according to the command providing instruction 154 included in the first file 40. The printer 10 acquires the specific command 130 (S22). Then, the second providing unit 52 (refer to FIG. 1) of the printer 10 reads the second file 42 from the memory 34 and provides the read second file 42 to the terminal device 70 (S24). The second file 42 includes an error page display instruction 170. The error page display instruction 170 is the source code for making the web browser 98 execute error page display processing (refer to step S26).

Figure 6:
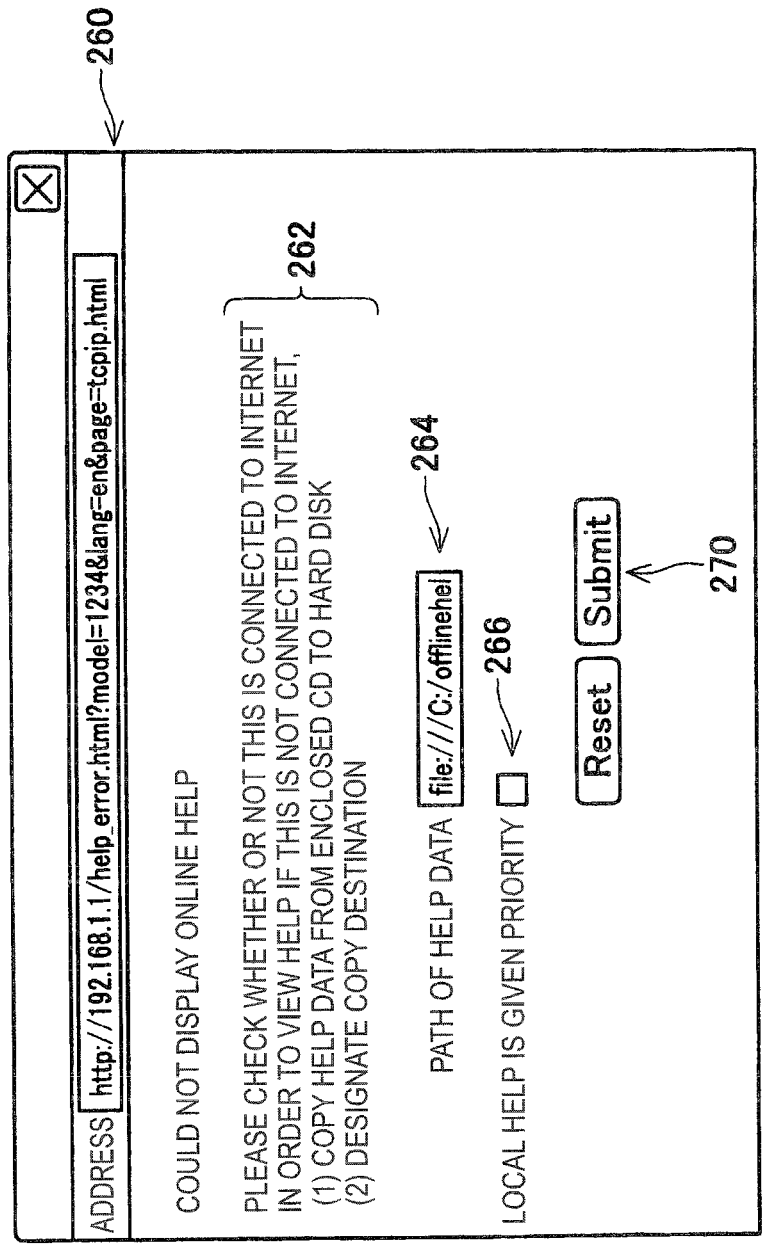
FIG. 6 shows an example of an error page.

After acquiring the second file 42, the web browser 98 displays an error page 260 of FIG. 6 on the display unit 74 according to the error page display instruction 170 (S26). As shown in FIG. 6, the error page 260 includes a message 262, a help data path input field 264, a local precedence setting field 266, and a submit button 270.

The message 262 shows a solution for displaying the help information on the display unit 74 by acquiring the help information by a different method from the method of acquiring the online help file 112 from the help server 110. In the present embodiment, the different method is a method in which the terminal device 70 acquires the local help file 106 from the recording medium 104 (refer to FIG. 1).

The user of the terminal device 70 can follow the solution indicated by the message 262. That is, the user places the recording medium 104 into the recording medium reader 102 according to a message "(1) Copy help data to a hard disk from enclosed CD" in the message 262. The terminal device 70 reads the recording medium 104 using the recording medium reader 102. The terminal device 70 displays a designation screen (not shown) on the display unit 74 according to a program (not shown) stored in the recording medium 104. The user designates a specific path, which indicates the local help storage region 100 for storing the local help file 106, on the designation screen. After designating the specific path, the terminal device 70 reads the local help file 106 from the recording medium 104 using the recording medium reader 102 and stores (copies) the local help file in the local help storage region 100. After the local help file 106 is stored in the local help storage region 100, the terminal device 70 ends the display of the designation screen. Moreover, according to a message "(2) Designate a copy destination" in the message 262, the user inputs a specific path indicating the local help storage region 100 in the path input field 264 and operates the submit button 270 (S28). When the user operates the submit button 270, the cookie indicating that the specific path is stored in the memory 94 (S30). Since the recording medium 104 is formed separately from the help server 110, the terminal device 70 can acquire the local help file 106 from the recording medium 104 even in the case where the terminal device 70 and the help server 110 cannot communicate with each other. In addition, since the recording medium 104 is formed separately from the printer 10, the printer 10 itself does not need to store the local help file 106. Accordingly, the amount of information that the printer 10 should store can be reduced.

Moreover, although not shown in FIG. 2, when the submit button 270 is operated in a state where a specific path is not input in the path input field 264 in the error page 260 in step S28 or when the path input in the path input field 264 is not present in the memory 94, the web browser 98 returns to step S26 to display the error page 260 of FIG. 6 on the display unit 74 again and monitor whether or not the submit button 270 is operated in a state where a correct specific path is input in the path input field 264.

Figure 7:
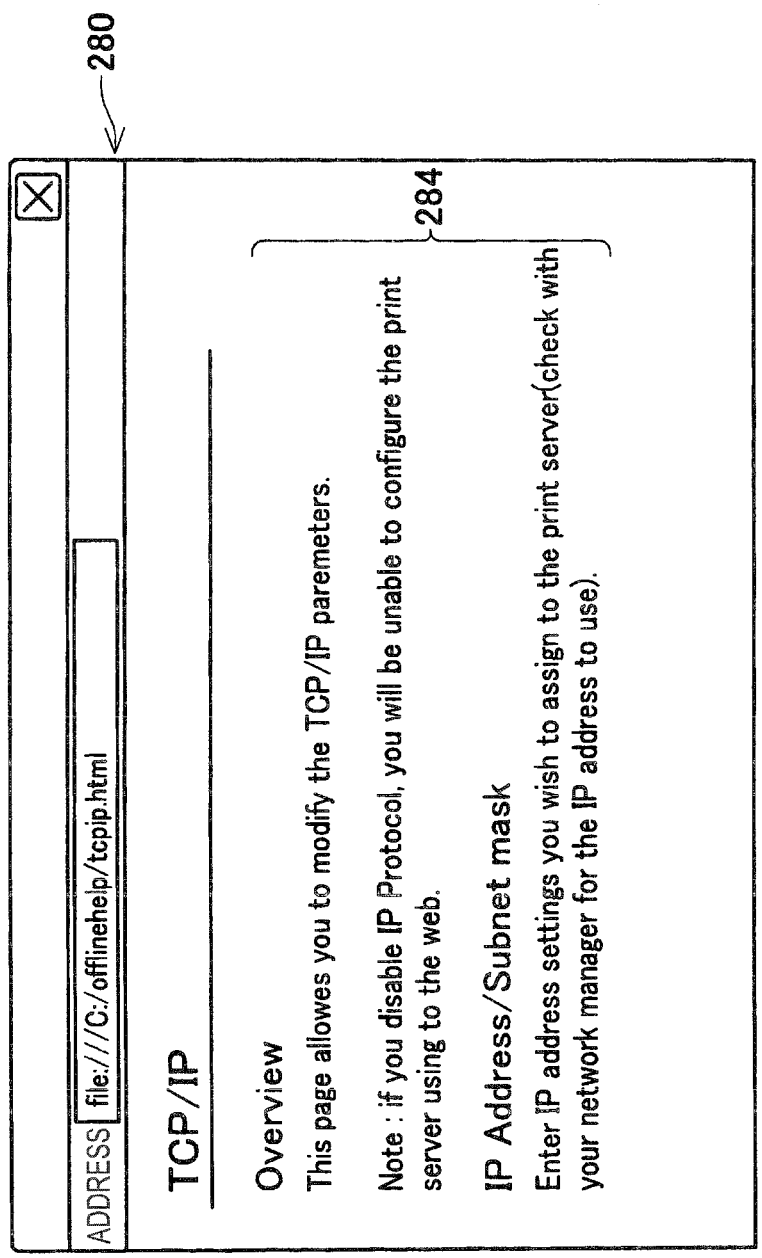
FIG. 7 shows an example of a local help page.

After step S30 ends or when it is determined that a specific path is already designated in step S20 (YES in step S20), the web browser 98 transmits a local help request command 132 to the local help storage region 100 according to the second help instruction 162 included in the first file 40. As a result, the web browser 98 acquires the local help file 106 from the local help storage region 100. Then, the web browser 98 displays a local help page 280 of FIG. 7 on the display unit 74 according to the second help instruction 162 (S32). The local help page 280 includes help information 284 included in the local help file 106. The content of the local help page 280 shown in FIG. 7 is the same as the content of the online help page 240 shown in FIG. 5. Here, the address field in the local help page 280 of FIG. 7 indicates a path in the memory 94 of the terminal device 70, and the address field in the online help page 240 of FIG. 5 indicates a path in the help server 110.

In addition, since the cookie indicating the specific path input in the path input field 264 is stored in the memory 94 by the processing in step S30, a determination as YES is made in subsequent step S20. In this case, the web browser 98 can acquire the local help file 106 from the local help storage region 100 and display the local help file on the display unit 74 of the terminal device 70. Moreover, in this case, communication of the specific command 130 and the second file 42 is not executed between the printer 10 and the terminal device 70. Therefore, the communication load between the printer 10 and the terminal device 70 can be reduced.

In addition, a local precedence setting field 266 included in the error page 260 shown in FIG. 6 is a check field for setting local precedence. Under the conditions where the local precedence setting field 266 is checked when the submit button 270 is operated, a cookie indicating that setting of local precedence has been performed is stored in the memory 94. If the cookie indicating that setting of local precedence has been performed is stored in the memory 94, a determination as YES is made in subsequent step S14. In this case, the terminal device 70 acquires a local help file 108 from the local help storage region 100 by executing the processing from step S20 and displays the local help file on the display unit 74 of the terminal device 70 (S32). Therefore, even in the case where the terminal device 70 cannot communicate with the help server 110 or the communication environment of the terminal device 70 and the help server 110 is not good, the local help page 280 can be provided without making the user of the terminal device 70 wait until the web browser 98 times out. Moreover, in this case, communication of the connection check 124, the OK signal 126, the command 128, and the file 112 is not executed between the terminal device 70 and the help server 110. Therefore, the communication load between the terminal device 70 and the help server 110 is reduced.

Figure 8A:
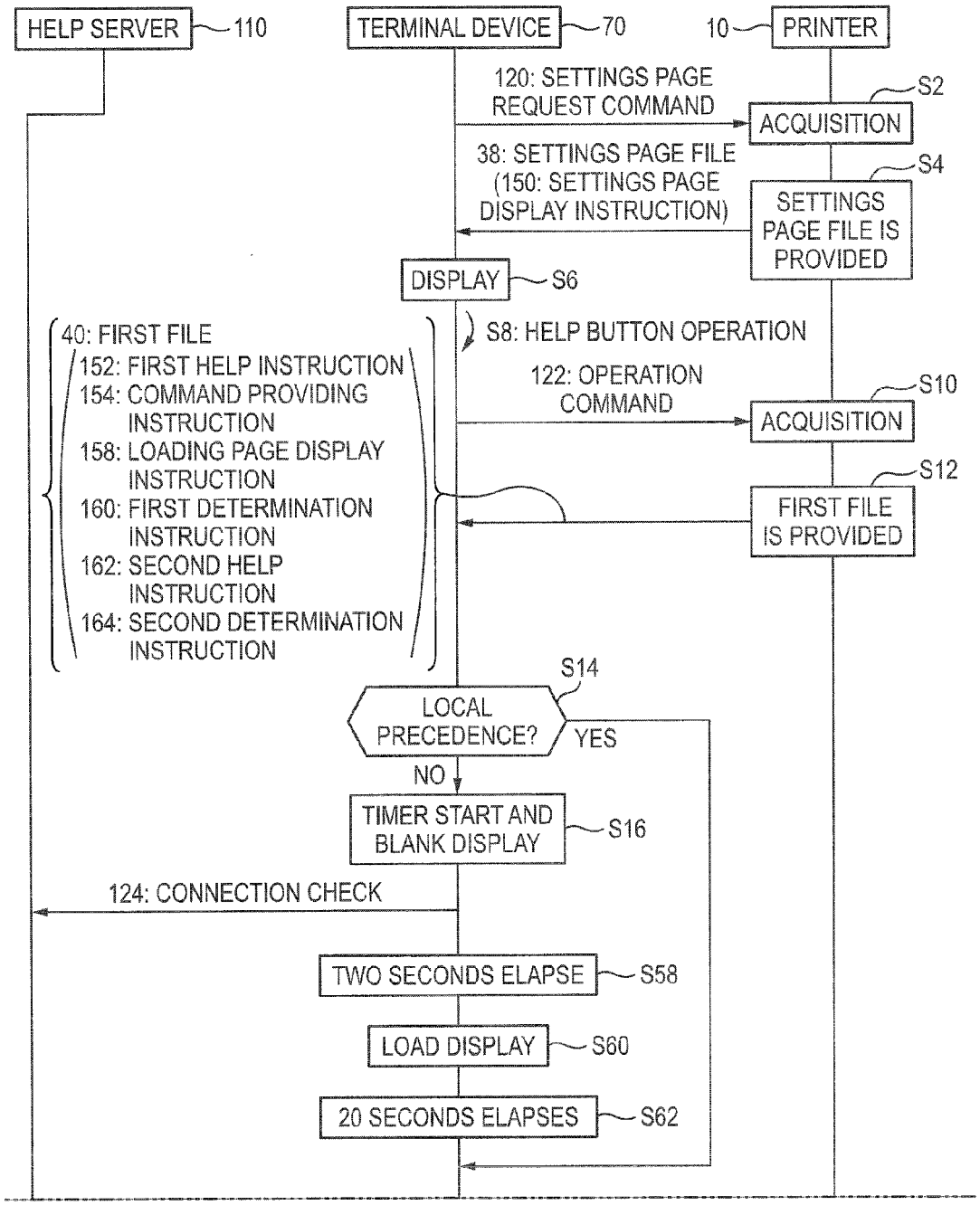
FIGS. 8A-8B are views showing the sequence of processing of each device when a terminal device cannot acquire an online help file.
Figure 8B:
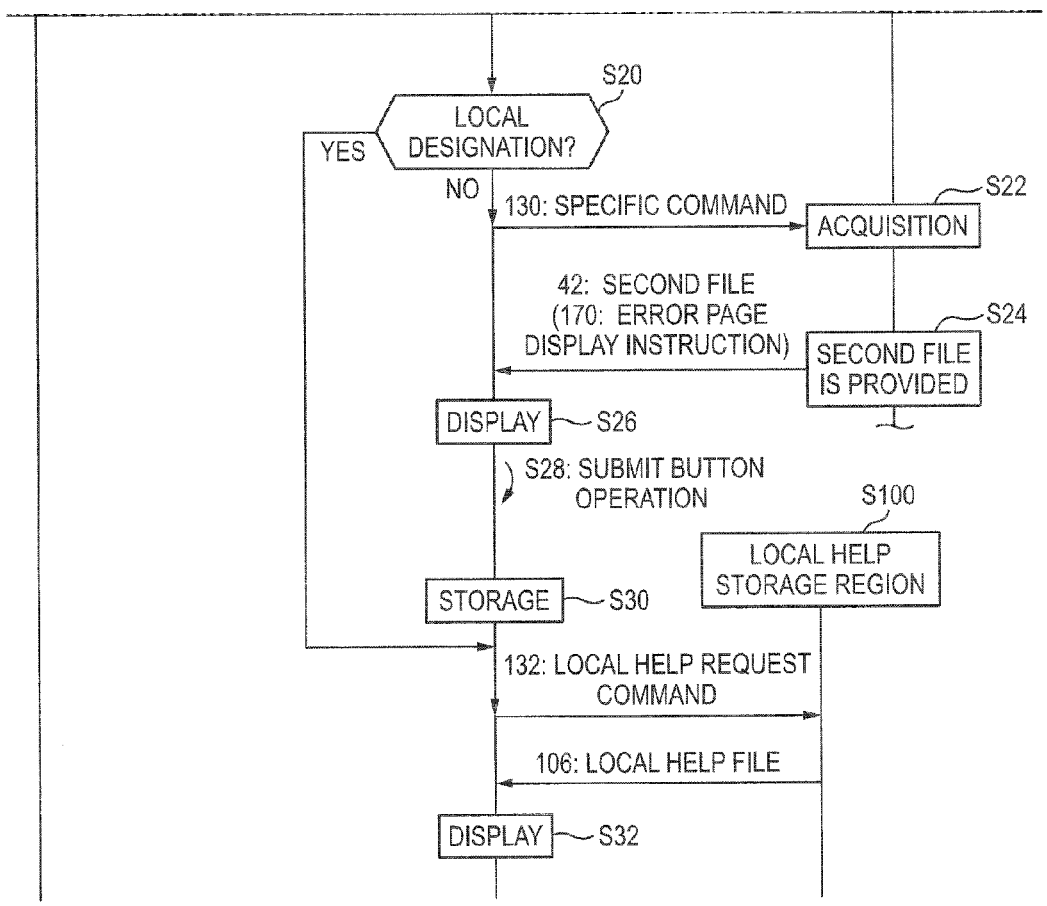

(5-2) Processing when the Terminal Device 70 and the Help Server 110 are Unable to Communicate with Each Other Next, referring to FIG. 8, processing when the terminal device 70 and the help server 110 cannot communicate with each other will be described. In this case, the web browser 98 cannot acquire the online help file 112 from the help server 110. In FIG. 8, the same processing, commands, files, and the like as in the example shown in FIG. 2 are denoted by the same reference numerals. Also in the example shown in FIG. 8, after step S16 ends, the web browser 98 transmits the connection check 124 to the help server 110 according to the first help instruction 152 included in the first file 40. Unlike the example shown in FIG. 2, the terminal device 70 and the help server 110 cannot communicate with each other in the example shown in FIG. 8. Accordingly, the help server 110 cannot acquire the connection check 124. As a result, the web browser 98 cannot acquire the OK signal 126 from the help server 110 (refer to FIG. 2). For this reason, after the start of a timer in step S16, two seconds elapse without displaying the online help page 240 (refer to FIG. 5) on the display unit 74 (S58). The blank page 220 shown in FIG. 4 is displayed for those two seconds. If two seconds elapse after the start of a timer, the web browser 98 displays the loading page 300 of FIG. 9 on the display unit 74 according to the loading page display instruction 158 included in the first file 40 (S60). The loading page 300 includes a display 302 showing that the terminal device 70 is accessing the help server 110.

Figure 5:
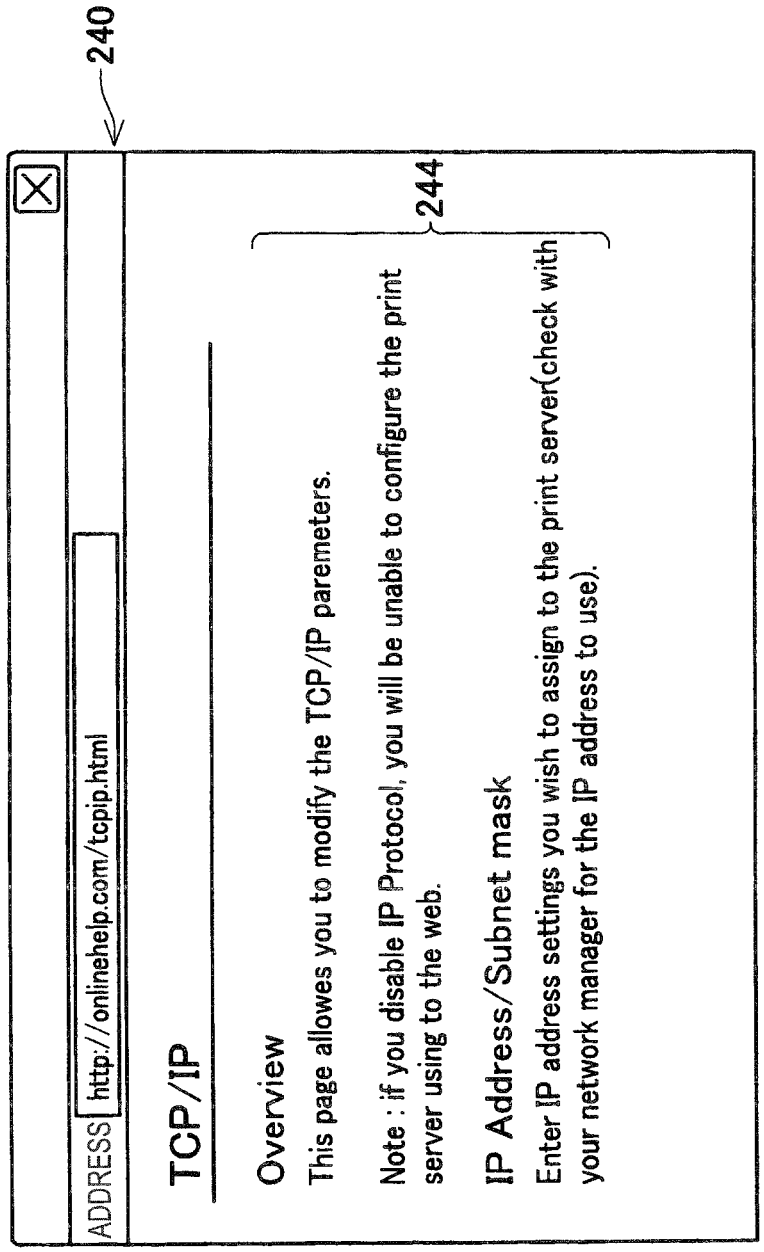
FIG. 5 shows an example of an online help page.
Figure 9:
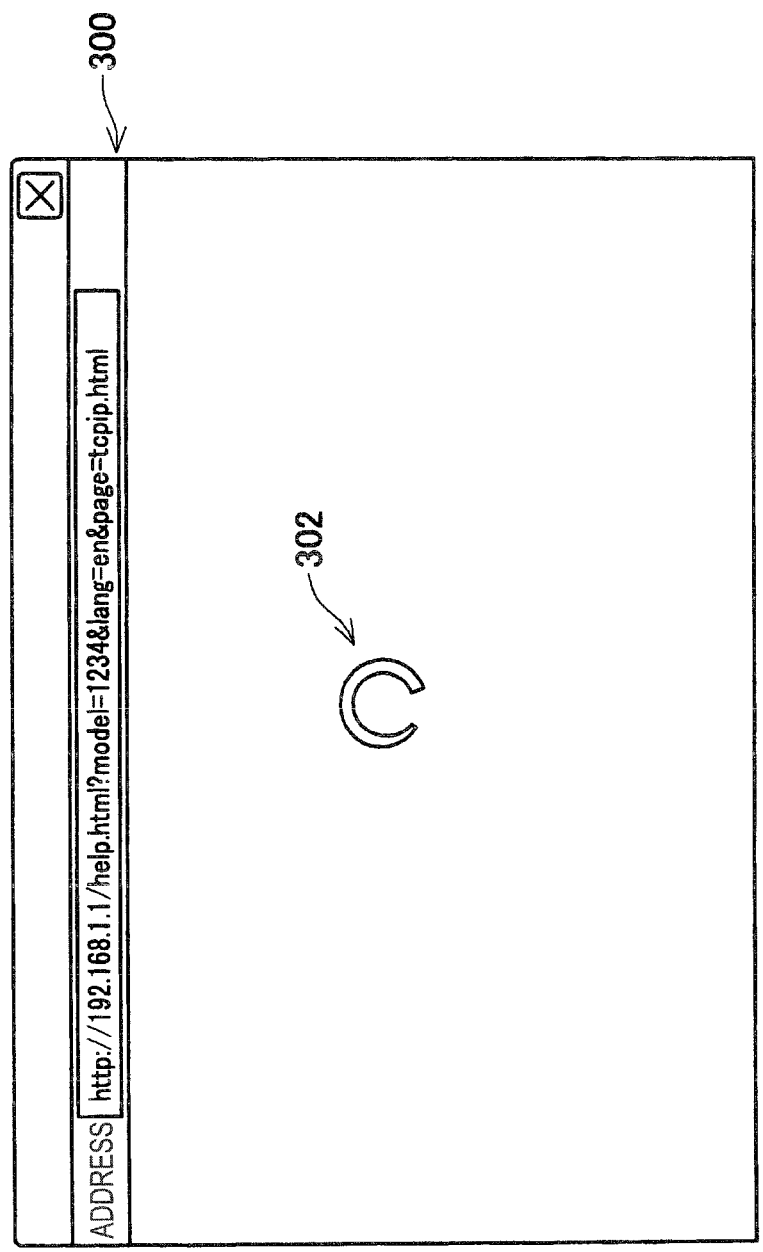
FIG. 9 shows an example of a loading page.

As described above, in the present embodiment, the web browser 98 displays the blank page 220 without displaying the loading page 300 shown in FIG. 9 until two seconds elapse after the start of a timer (that is, after accessing the help server 100). The reason is as follows. For example, when the help server 110 and the terminal device 70 can communicate with each other (in the case of the example shown in FIG. 2), the web browser 98 can acquire the online help file 112 from the help server 110 within two seconds after the start of a timer. In this case, the web browser 98 can display the online help page 240 shown in FIG. 5 within two seconds of the start of a timer. That is, the web browser 98 can display the online help page 240 shown in FIG. 5 quickly. If a configuration is adopted in which the loading page 300 shown in FIG. 9 is displayed from immediately after the start of a timer, the loading page 300 shown in FIG. 9 is displayed only for a very short period of time and then the online help page 240 shown in FIG. 5 is displayed in a situation where the web browser 98 can display the online help page 240 shown in FIG. 5 quickly. In this case, since the display 302 included in the loading page 300 shown in FIG. 9 is momentarily displayed, the user of the terminal device 70 may feel uncomfortable.

On the other hand, in the present embodiment, the blank page 220 is displayed without displaying the loading page 300 shown in FIG. 9 until two seconds elapse after the start of a timer. Therefore, in the situation where the web browser 98 can display the online help page 240 shown in FIG. 5 quickly (that is, in the situation where the web browser 98 can display the online help page 240 shown in FIG. 5 within two seconds), the blank page 220 is displayed and then the online help page 240 shown in FIG. 5 is displayed. Since display of the loading page 300 only for a very short period of time can be suppressed, a user's feeling of discomfort caused by the terminal device 70 can be suppressed.

In the example shown in FIG. 8, the loading page 300 (FIG. 9) is displayed in step S60, and then 20 seconds elapses after the start of a timer in S16 without displaying the online help page 240 (refer to FIG. 5) on the display unit 74 (S62). If 20 seconds elapses after the start of a timer, the process proceeds to step S20. In step S20, the web browser 98 determines whether or not the specific path is already designated according to the first determination instruction 160, similar to the example shown in FIG. 2. Each processing from S20 is the same as that in the example shown in FIG. 2. In addition, a time of 20 seconds after the start of a timer in step S16 is shorter than a time-out time (for example, 1 minute) of the web browser 98. In the present embodiment, if NO in step S20, the web browser 98 transmits the specific command 130 to the printer 10 immediately after 20 seconds elapses in S62 and before the time-out time elapses. Therefore, the web browser 98 can display the error page 260 shown in FIG. 6 before the time-out time elapses (S26). As a result, a time-out page (refer to FIG. 12) which should be displayed when the time-out time of the web browser 98 has elapsed is not displayed on the display unit 74 of the terminal device 70. Accordingly, it is possible to notify the user of the solution before a time-out page is displayed on the display unit 74.

The communication system 2 of the present embodiment has been described in detail. As shown in steps S24 and S26 of FIGS. 2 and 8, the printer 10 provides the terminal device 70 with the error page display instruction 170 for displaying the error page 260 (refer to FIG. 6) including the message 262 on the display unit 74 of the terminal device 70. The message 262 shows that the help information 244 (refer to FIG. 5) included in the online help file 112 is not displayed on the display unit 74 and also shows a solution for displaying the help information on the display unit 74 in a different method from the method of acquiring the online help file 112 from the help server 110. Therefore, according to the present embodiment, a solution when the online help page 240 including the help information 244 acquired from the help server 110 is not displayed on the display unit 74 can be sent to the user of the terminal device 70. The user can display the help information 284 on the display unit 74 of the terminal device 70 according to the solution when the online help page 240 is not displayed.

The correspondence relationship between the configuration of the above-described embodiment and the configuration of the present invention will now be described. The printer 10 and the help server 110 are examples of a "communication device" and an "external server", respectively. The help information 244 shown in FIG. 5 and the help information 284 shown in FIG. 7 are examples of "predetermined information". The first help instruction 152 shown in FIG. 2 (FIG. 8), the second help instruction 162, and the error page display instruction 170 are examples of a "first web page display instruction", an "information display instruction", and a "second web page display instruction", respectively. The online help page 240 shown in FIG. 5, the error page 260 shown in FIG. 6, and the loading page 300 shown in FIG. 9 are examples of a "first web page", a "second web page", and a "third web page", respectively. The processing from transmission of the connection check 124 to step S18 in FIG. 2, the processing of step S26 in FIG. 2 (FIG. 8), and the processing of S60 in FIG. 8 are examples of "first web page display processing", "second web page display processing", and third web page display processing", respectively. The message 262 shown in FIG. 6 is an example of a "specific message". The recording medium 104 shown in FIG. 1 is an example of a "specific storage unit". 20 seconds of step S62 and two seconds of step S58 in FIG. 8 are examples of a "first predetermined time" and a "second predetermined time", respectively. The period until two seconds elapse in step S58 after the start of a timer in step S16 in FIG. 8 and the period until 20 seconds elapses in step S62 after two seconds elapse in step S58 are examples of a "first period" and a "second period", respectively. The display 302 shown in FIG. 9 is an example of a "specific display". The local help storage region 100 shown in FIG. 1, the specific path 282 shown in FIG. 7, and the path input field 264 shown in FIG. 6 are examples of a "specific region", "specific position information", and an "input field", respectively. The processing of step S20, the processing of step S14, and the processing of step S32 in FIG. 2 (FIG. 8) are examples of "first determination processing", "second determination processing", and "information display processing", respectively. The method of acquiring the online help file 112 from the help server 110 and the method of acquiring the local help file 106 from the local help storage region 100 are examples of a "first method" and a "second method", respectively.

Second Embodiment

An explanation regarding a second embodiment will be focused on a different point from the first embodiment described above. In the present embodiment, in the memory 34 of the printer 10 shown in FIG. 1, the specific file 44 is stored instead of the first and second files 40 and 42.

Figure 10:
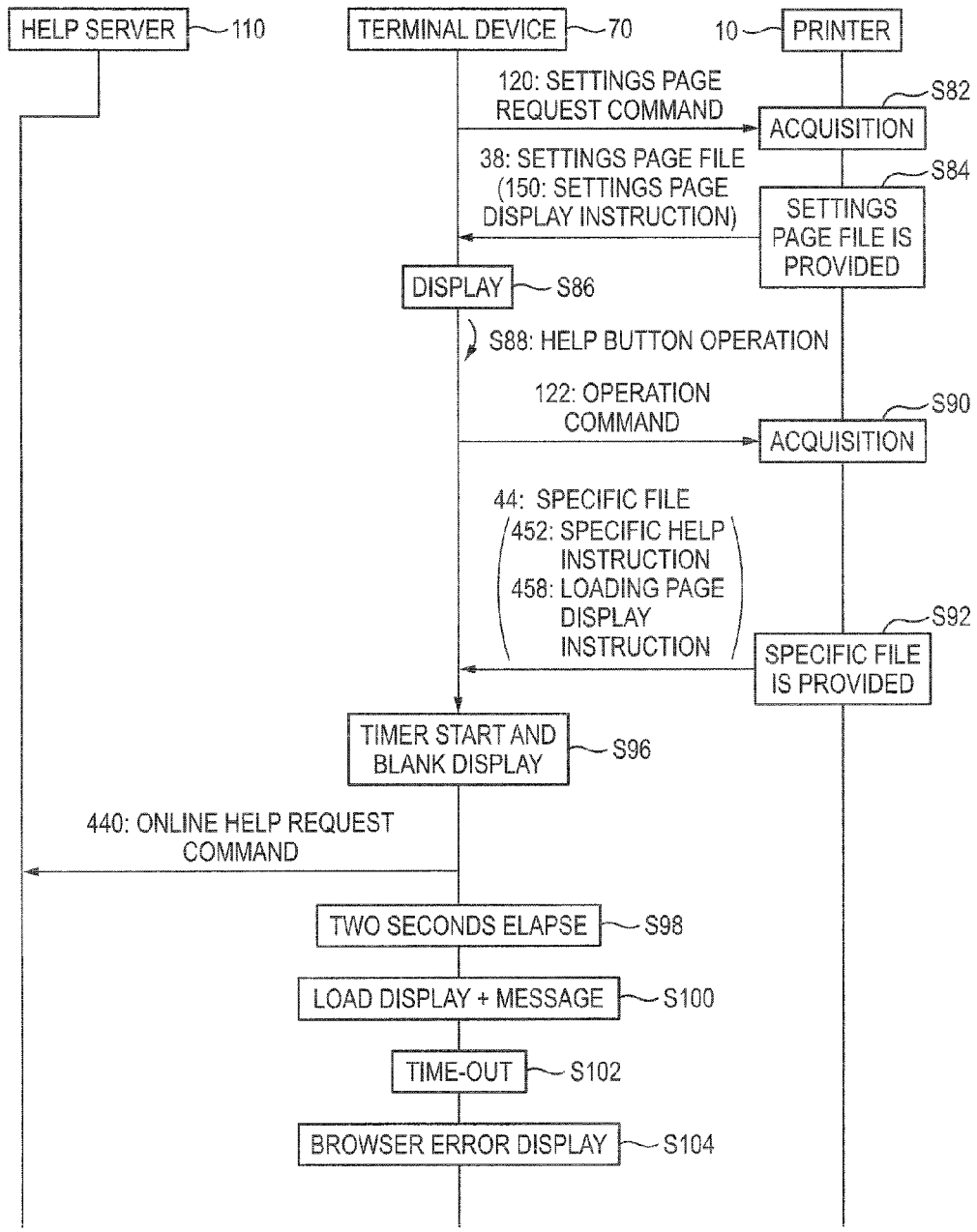
FIG. 10 is a view showing the sequence of processing of each device when a terminal device cannot acquire an online help file in a second embodiment.
Figure 11:
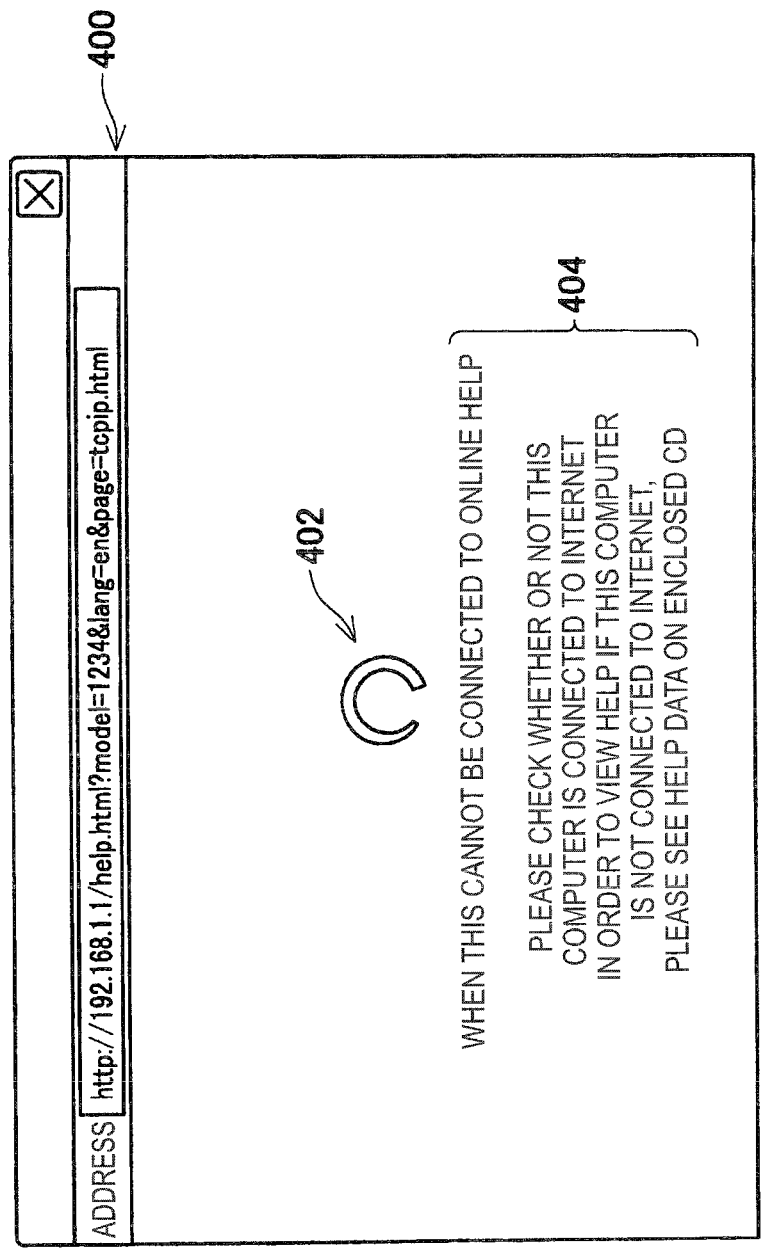
FIG. 11 shows an example of a loading page.
Figure 12:
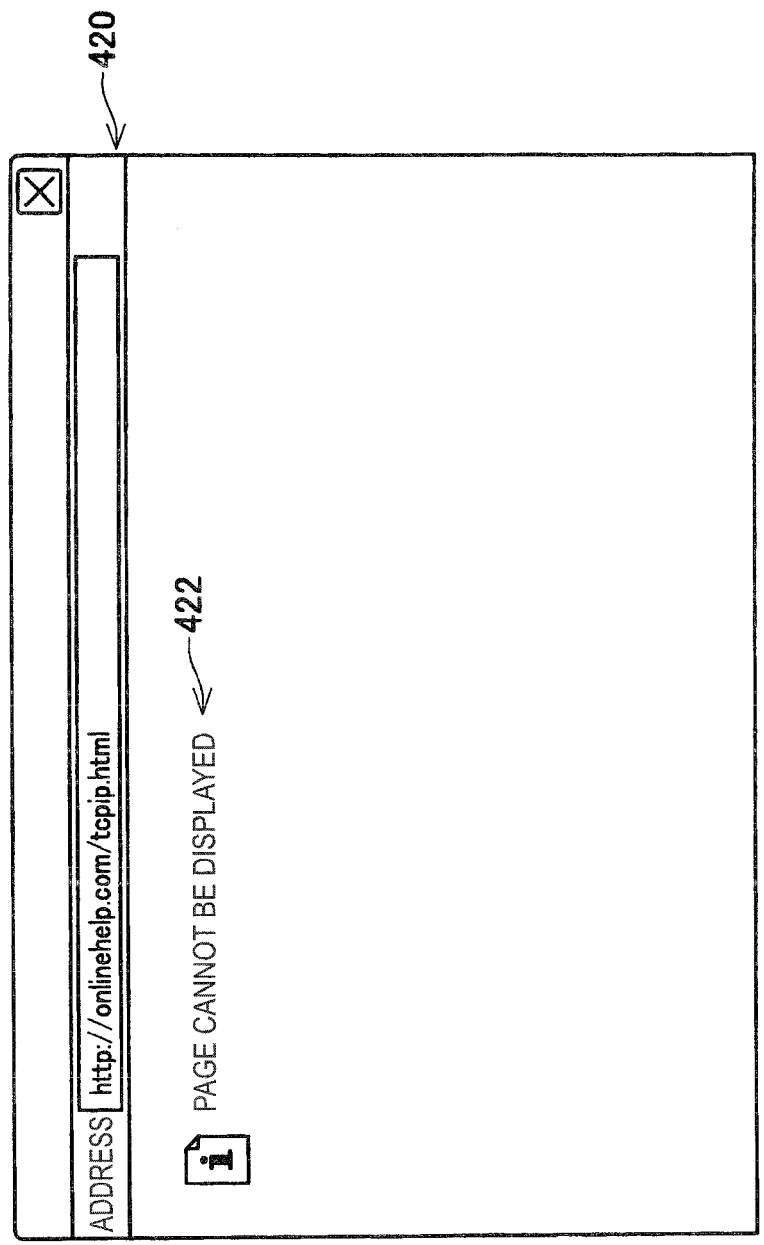
FIG. 12 shows an example of a time-out page.

(1) Processing when the Terminal Device 70 and the Help Server 110 Cannot Communicate with Each Other Next, referring to FIGS. 10 to 12, processing when the terminal device 70 and the help server 110 cannot communicate with each other will be described. In this case, the web browser 98 cannot acquire the online help file 112 from the help server 110. Each processing of steps S82 to S90 in FIG. 10 is the same as the processing of steps S2 to S10 in the first embodiment. In step S90, the printer 10 acquires the operation command 122. Then, the first and second providing units 50 and 52 (refer to FIG. 1) of the printer 10 provide the terminal device 70 with the specific file 44 stored in the memory 34 (S92). The specific file 44 includes a specific help instruction 452 and a loading page display instruction 458. The specific help instruction 452 and the loading page display instruction 458 included in the specific file 44 are source codes for making the web browser 98 execute various kinds of processing described below.

When the specific file 44 is acquired, the web browser 98 starts a timer according to the specific help instruction 452 (S96). In addition, at the point of time of step S96, the web browser 98 does not display a web page (loading page 400 shown in FIG. 11) on the display unit 74 according to the loading page display instruction 458. Therefore, at the point of time of step S96, the blank page 220 shown in FIG. 4 is displayed on the display unit 74 of the terminal device 70.

After step S96 shown in FIG. 10 ends, the web browser 98 transmits an online help request command 440 to the help server 110 according to the specific help instruction 452. In addition, in the present embodiment, the web browser 98 does not transmit a connection check (refer to reference numeral 124 in FIG. 2). In the example shown in FIG. 10, the terminal device 70 and the help server 110 cannot communicate with each other. For this reason, the help server 110 cannot acquire the online help request command 440 transmitted from the terminal device 70. As a result, the web browser 98 cannot acquire the online help file 112 from the help server 110. Accordingly, after the start of a timer in step S96, two seconds elapse without displaying the online help page 240 (refer to FIG. 5) on the display unit 74 (S98). If two seconds elapse after the start of a timer, the web browser 98 displays the loading page 400 of FIG. 11 on the display unit 74 according to the loading page display instruction 458 (S100). In the present embodiment, the loading page 400 includes a display 402, which shows that the terminal device 70 is accessing the help server 110, and a message 404, as shown in FIG. 11. The message 404 indicates a solution when the help information 244 (refer to FIG. 5) included in the online help file 112 is not displayed on the display unit 74. The solution indicated by the message 404 shows that the help information 284 is displayed when the terminal device 70 acquires the local help file 106 stored in the recording medium 104 (refer to FIG. 1).

As described above, also in the present embodiment, the web browser 98 does not display the loading page 400 until two seconds elapse after the start of a timer and displays the loading page 400 after two seconds elapse. For this reason, also in the present embodiment, display of the loading page 400 only for a very short period of time can be suppressed in a situation where the web browser 98 can display the online help page 240 of FIG. 5 quickly. As a result, a user's feeling of discomfort caused by the terminal device 70 can be suppressed.

In the example shown in FIG. 10, the loading page 400 (FIG. 11) is displayed in step S100, and then a time-out time of the web browser 98 elapses after the start of a timer in S96 without displaying the online help page 240 (refer to FIG. 5) on the display unit 74 (S102). In this case, the web browser 98 displays a time-out page 420 of FIG. 12 on the display unit 74 (S104). The time-out page 420 includes an error message 422 showing that a page cannot be displayed.

The communication system 2 of the present embodiment has been described in detail. In the present embodiment, the loading page 400 including the message 404 is displayed on the display unit 74 before the time-out time of the web browser 98 elapses, as shown in step S98 of FIG. 10. For this reason, the solution can be sent to the user of the terminal device 70 before the time-out time of the web browser 98 elapses. Therefore, it is possible to notify the user of the solution before a time-out page is displayed on the display unit 74.

The correspondence relationship between the configuration of the above-described embodiment and the configuration of the present invention will now be described. The specific help instruction 452 and the loading page display instruction 458 shown in FIG. 10 are examples of a "first web page display instruction" and a "second web page display instruction", respectively. The processing of step S100 in FIG. 10 is an example of "second web page display processing". The specific file 44 shown in FIGS. 1 and 10 is an example of a "same file". The loading page 400, the message 404, and the display 402 shown in FIG. 11 are examples of a "second web page", a "specific message", and a "specific display", respectively. Two seconds of step S98 in FIG. 10 is an example of a "third predetermined time". The period until two seconds elapse in step S98 after the start of a timer in step S96 in FIG. 10 and the period until the time-out time elapses in step S102 after two seconds elapse in step S98 are examples of a "third period" and a "fourth period", respectively.

Third Embodiment

In the present embodiment, the connection check 124 and the OK signal 126 in the first embodiment are omitted. Specifically, in the present embodiment, the first help instruction 152 included in the first file 40 is different from that in the first embodiment. In the present embodiment, the web browser 98 transmits the online help request command 128 without performing the connection check 124 according to the first help instruction 152 included in the first file 40. Moreover, in the present embodiment, the help server 110 does not store the online help file 112 including a source code for displaying the online help page 240 and stores a file including only the help information. The online help request command 128 is a command requesting the help server 110 to transmit the file. After receiving the file, the web browser 98 displays the online help page 240 including the help information 244 on the display unit 74. On the other hand, processing when the web browser 98 does not receive the file even if two seconds elapse after accessing the help server 10 is the same as that in the first embodiment. That is, the web browser 98 executes each processing of steps S58, S60, S62, S20, and S32 according to the instructions 154 to 162 included in the first file 40. Moreover, in the present embodiment, Ajax (Asynchronous Java (registered trademark) Script+XML) is used.

Modified Exemplary Embodiments

Modifications of the above embodiment will be described below.

(1) In the first embodiment, the settings page file 38 shown in FIGS. 2 and 8 includes only the settings page display instruction 150. However, the settings page file 38 may include the first help instruction 152, the command providing instruction 154, the loading page display instruction 158, the first determination instruction 160, the second help instruction 162, and the second determination instruction 164 in addition to the settings page display instruction 150. That is, the first and second providing units 50 and 52 may provide the terminal device 70 with the settings page file 38 including the instructions 152 to 164. In this modification, if a help button operation (refer to step S8 in FIG. 2) is executed, the web browser 98 determines whether or not setting of the terminal device 70 is local precedence according to the second determination instruction 164, which is included in the settings page file 38, without transmitting the operation command 122 to the printer 10 (S14 in FIG. 2). In addition, the web browser 98 executes each processing of steps S16, S18, S20, and S32 according to the instructions 152 to 164 included in the settings page file 38. In addition, the feature of this modification may also be applied to the second embodiment. That is, the settings page file 38 shown in FIG. 10 may include the specific help instruction 452 and the loading page display instruction 458. In this modification, if a help button operation (refer to step S88 in FIG. 10) is executed, the web browser 98 executes each processing of steps S96, S98, and S100 according to the specific help instruction 452 and the loading page display instruction 458 without transmitting the operation command 122 to the printer 10.

(2) In each of the embodiments described above, the case where the help server 110 provides the help information has been described as an example. However, the invention is not limited to this. For example, a server on the Web which holds a printer driver of the printer 10 may be an embodiment which provides the printer driver to the terminal device 70. More specifically, when a user operates an install button, the web browser receives an install page including the link for a printer driver from a server on the Web. When an install page is not received even if a predetermined time elapses, the web browser displays an error page including a message which recommends installing a printer driver from a CD that stores the printer driver. In this case, the "predetermined information" is a link of a printer driver and the "first web page" is an install page. In addition, a server on the Web may provide the terminal device 70 with an order page of consumable goods, such as ink and toner of the printer 10.

(3) In the second embodiment described above, the web browser 98 may determine whether or not setting of the web browser 98 is local precedence, similar to the processing of step S14 in FIG. 2 in the first embodiment. In this modification, the specific file 44 shown in FIG. 10 includes a second determination instruction (refer to reference numeral 164 in FIG. 2), similar to the first embodiment. Moreover, in the second embodiment described above, the path input field 264 for inputting a specific path indicating the local help storage region 100 and the local precedence setting field 266 (refer to FIG. 6) for performing setting of local precedence are not present in the loading page 400 (refer to FIG. 11). In this modification, therefore, a user needs to input the setting of local precedence and a specific path, which indicates the local help storage region 100, in advance on another setting screen.

(4) In the third embodiment described above, the command providing instruction 154 is included in the first file 40, and the web browser 98 acquires the second file 42 from the printer 10 according to the command providing instruction 154 and displays a second web page. However, the configuration of the first file 40 is not limited to this. For example, the first file 40 may include an error page display change instruction instead of the command providing instruction 154. The error page display change instruction is an instruction for making the web browser 98 change the display of the display unit 74 of the terminal device 70 from a loading page (refer to FIG. 9) to an error page (refer to FIG. 6). In this case, the web browser 98 determines whether or not a specific path is already designated according to the first determination instruction 160 (refer to step S20 in FIGS. 2 and 8). If it is determined that a specific path is not designated, the web browser 98 changes the display to an error page according to the error page display change instruction.

(5) In the first embodiment described above, in the determination of step S14, it is determined whether or not a cookie, which indicates that the setting of local precedence was performed, is present in the memory 94. However, the invention is not limited to this, and it may be determined whether or not the setting of local precedence is stored in the printer 10.

(6) In the first embodiment described above, the recording medium 104 is an example of a "specific storage unit". However, the "specific storage unit" is not limited to the recording medium 104 and may be a server on the LAN 4 which the terminal device 70 can access. In addition, although the local help storage region 100 in the terminal device 70 is an example of a "specific region", the "specific region" is not limited to this. For example, it may be a local help storage region in a server on the LAN 4 which the terminal device 70 can access and which stores the help information.

While the specific examples of the invention have been described in detail, these are for illustrative purposes and are not intended to limit the scope of the invention defined in the appended claims. Various modifications and changes of the specific examples illustrated above are included in the techniques defined in the appended claims.

In addition, technical elements described in this specification or drawings are technically useful independently or by various combinations and are not limited to combinations defined in the appended claims. In addition, the techniques illustrated in this specification or drawings are proposed to achieve a plurality of objects simultaneously, and the technical utility is obtained by achieving one of them.

What is claimed is:

1. A system comprising:
an external server that stores predetermined information including an online help file;
a terminal device with a web browser and a display unit; and
a communication device configured to communicate with the terminal device and the external server through a network, the communication device comprising:
a first providing unit that is configured to provide a first file including a first web page display instruction to the terminal device;
a second providing unit that is configured to provide a second file including a second web page display instruction to the terminal device; and
a memory; wherein
the terminal device is configured to transmit a settings page request command to the communication device;

in response to acquiring the settings page request command, the communication device reads a settings page file from the memory and provides the setting page file and a settings page display instruction to the terminal device;

in response to acquiring the settings page file and the settings page display instruction, the web browser displays a settings page on the display unit, the settings page including a help button;

when the help button operation is executed, the web browser transmits an operation command to the communication device;

the communication device acquires the operation command and then the first providing unit reads the first file from the memory and provides the first file to the terminal device, the first file including a first help instruction, a second help instruction, a command providing instruction and a second determination instruction;

after acquiring the first file, the web browser determines whether or not the web browser is set for local precedence according to the second determination instruction included in the first file;

in response to local precedence not being set, the web browser transmits an online help request command to the external server according to the first help instruction;

in response to acquiring the online help request command, the external server reads the online help file and provides the online help file to the terminal device;

in response to acquiring the online help file, the web browser displays an online help page on the display unit according to the first help instruction, in response to local precedence being set, the web browser provides a second file request command to the communication device according to the command providing instruction included in the first file;

the communication device acquires the second file request command and then the second providing unit reads the second file from the memory and provides the second file to the terminal device, the second file including an error page display instruction;

in response to acquiring the second file, the web browser displays an error page on the display unit according to the error page display instruction, the error page including a message and a help data path input field, the message showing an instruction for displaying help information;

the web browser transmits a local help request command to a local help storage region according to the second help instruction included in the first file;

the web browser acquires the local help file from the local help storage region; and the web browser displays a local help page on the display unit according to the second help instruction.

2. The system according to claim 1, when
the first file further includes a first determination instruction;

in response to local precedence being set, the web browser determines whether or not a path for the local help storage region is designated according to the first determination instruction;

in response to a path being designated, the web browser transmits the local help command to the local help storage region in accordance with the designated path;

in response to a path not being designated, the web browser provides the second file request command to the communication device.

3. The system according to claim 1,
wherein, when the predetermined information is not acquired from the external server even if a first predetermined time shorter than a time-out of the web browser elapses after the web browser accesses the external server according to the first web page display instruction, the command providing instruction makes the web browser execute command providing processing for providing the second file request command to the communication device before the time-out time elapses.

4. The system according to claim 3,
wherein the first file further includes a third web page display instruction for making the web browser execute a third web page display processing, in which:
a third web page is not displayed on the display unit of the terminal device during a first period until a second predetermined time shorter than the first predetermined time elapses after the web browser accesses the external server according to the first web page display instruction; and
the third web page is displayed on the display unit of the terminal device during a second period until the first predetermined time elapses after the second predetermined time elapses, and
wherein the third web page includes a specific display showing that the web browser is accessing the external server.

5. The system according to claim 4,
wherein the error page further includes an input field used when a user of the terminal device inputs specific position information indicating a specific region for storing the predetermined information,
wherein the first file further includes a first determination instruction for making the web browser execute a first determination processing of determining whether or not the specific position information has been set on the basis of inputting of the specific position information in the input field included in the error page displayed on the display unit of the terminal device, and
wherein the first file further includes an information display instruction for making the web browser execute an information display processing in which the predetermined information is acquired from the specific region indicated by the specific position information and displayed on the display unit of the terminal device without making the web browser execute the command providing processing when the predetermined information is not acquired from the external server even if the first predetermined time elapses after the web browser accesses the external server according to the first web page display instruction and it is determined that the specific position information is set in the first determination processing.

6. The system according to claim 5,
wherein the error page further includes a selection field used when the user of the terminal device makes a selection regarding precedence of a second method, in which the web browser acquires the predetermined information from the specific region, over a first method, in which the web browser acquires the predetermined information from the external server,
wherein the first file further includes a second determination instruction for making the web browser execute a second determination processing in which it is determined whether or not precedence of the second method has been set by selecting the precedence of the second method in the selection field included in the second web page displayed on the display unit of the terminal device, wherein the first web page display instruction is an instruction for making the web browser execute the first web page display processing when it is determined that the second method does not take priority in the second determination processing, and wherein the information display instruction is an instruction for making the web browser execute the information display processing without making the web browser execute the first web page display processing when it is determined that the second method takes priority in the second determination processing.

7. The system according to claim 1, wherein the first web page display instruction and the second web page display instruction are included in the same file, and wherein the second web page display instruction is an instruction for making the web browser execute the second web page display processing of displaying the second web page on the display unit of the terminal device during at least some of a period until a time-out of the web browser elapses after the web browser accesses the external server according to the first web page display instruction.

8. The system according to claim 7, wherein the second web page further includes a specific display showing that the web browser is accessing the external server.

9. The system according to claim 8, wherein in the second web page display processing, the second web page is not displayed on the display unit of the terminal device for a third period until a third predetermined time shorter than the time-out time elapses after the web browser accesses the external server according to the first web page display instruction, and the second web page is displayed on the display unit of the terminal device for a fourth period until the time-out elapses after the third predetermined time elapses.

\* \* \* \* \*